Feb. 8, 1944.                G. POOKHIR ET AL                2,341,287
                         TORPEDO CONTROLLING DEVICE
                           Filed Aug. 30, 1940                8 Sheets-Sheet 1
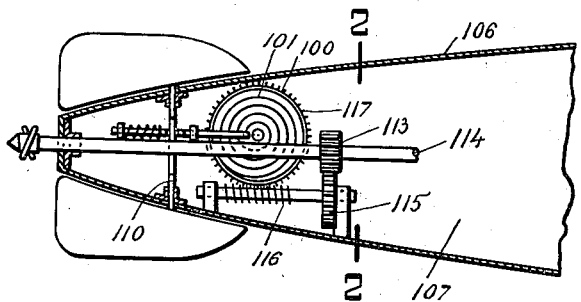
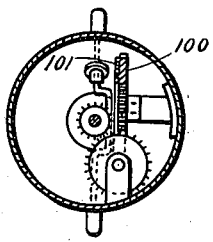
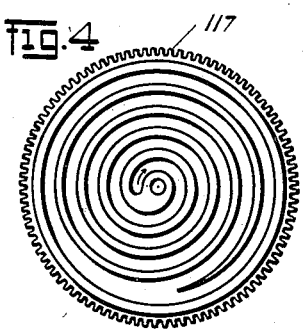
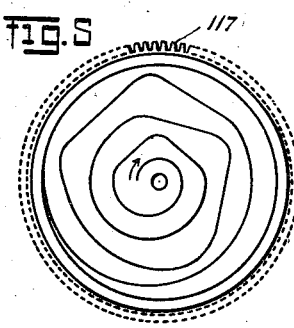
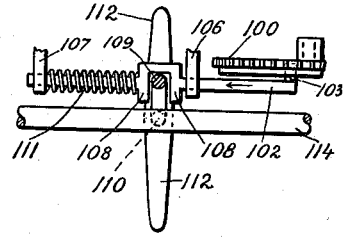
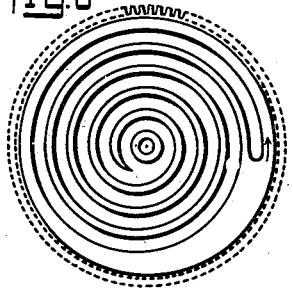
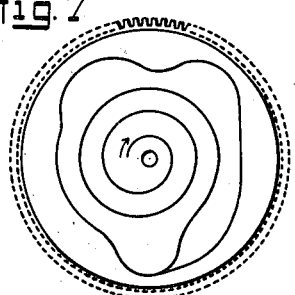
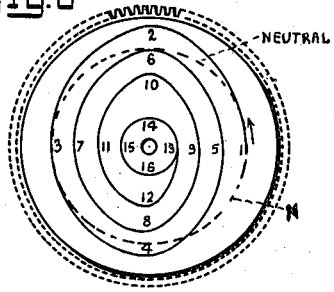
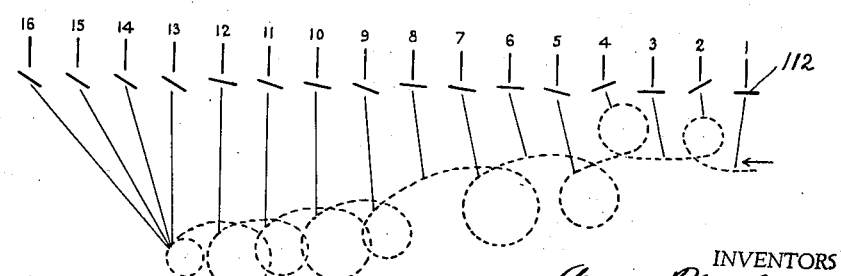
INVENTORS
George Pookhir
George A. Rubinow

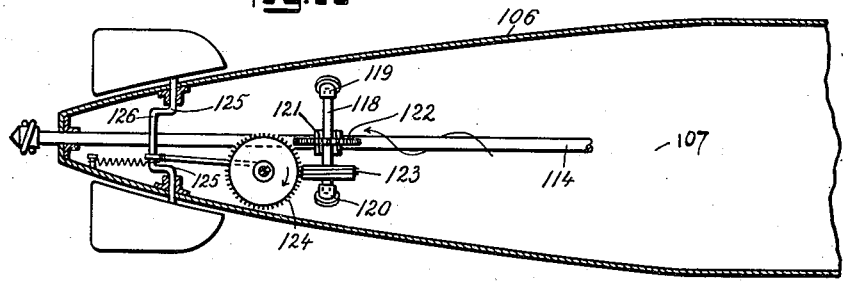
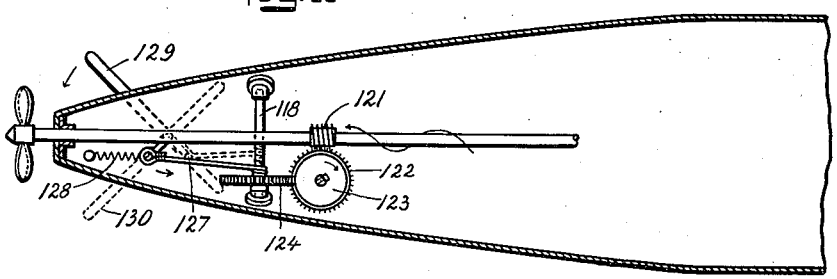
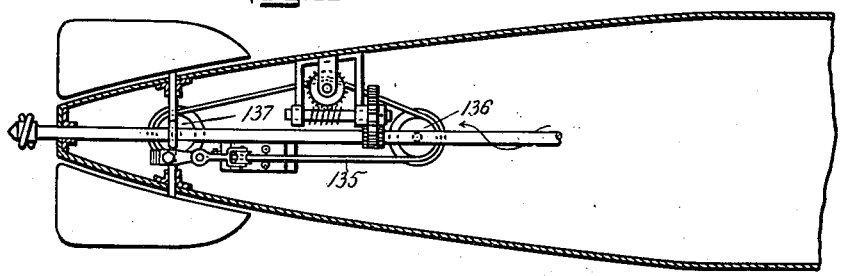
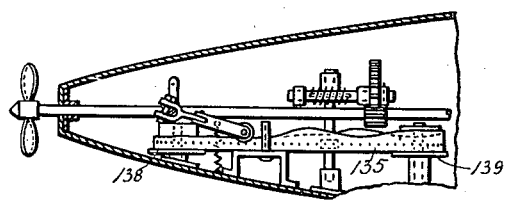

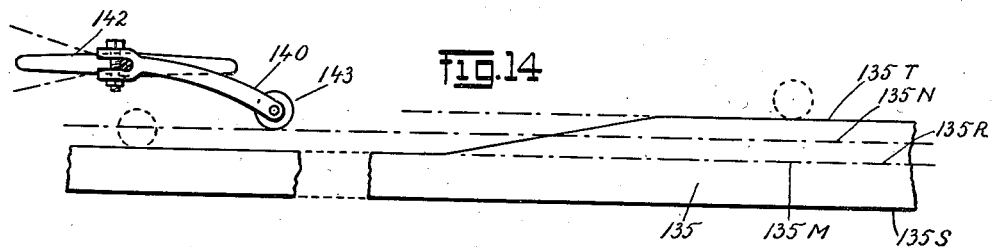
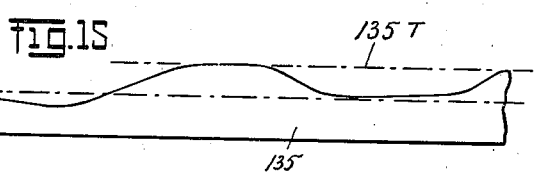
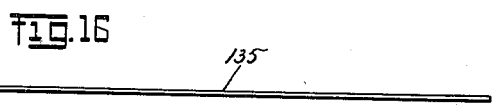
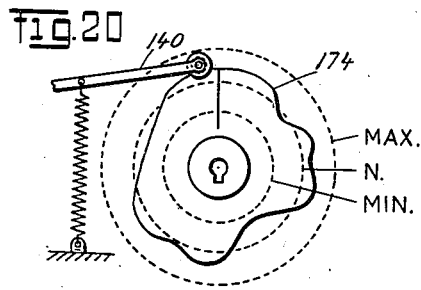
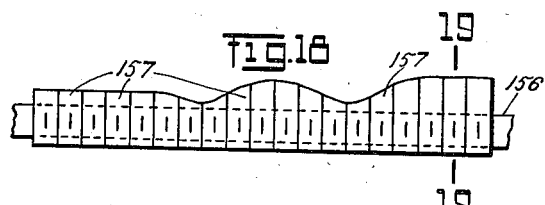
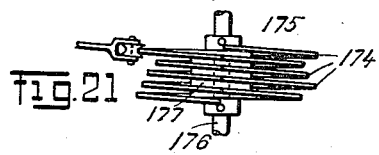
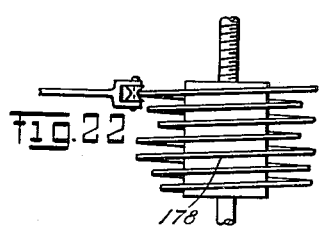
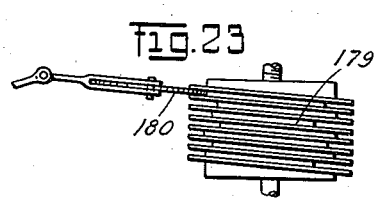
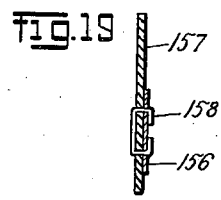

Feb. 8, 1944.    G. POOKHIR ET AL    2,341,287
TORPEDO CONTROLLING DEVICE
Filed Aug. 30, 1940    8 Sheets-Sheet 4
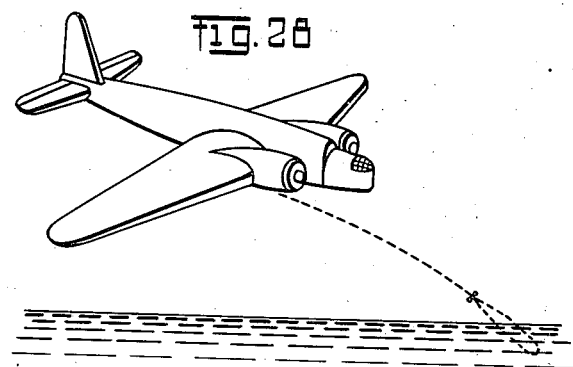
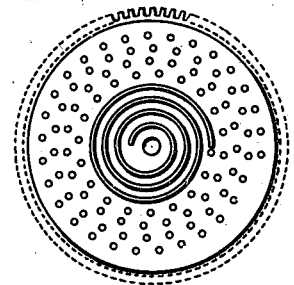
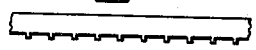
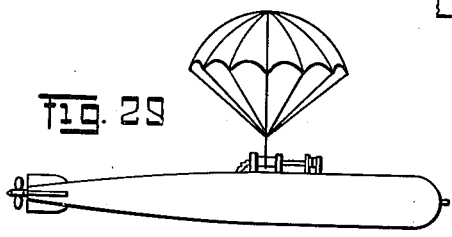
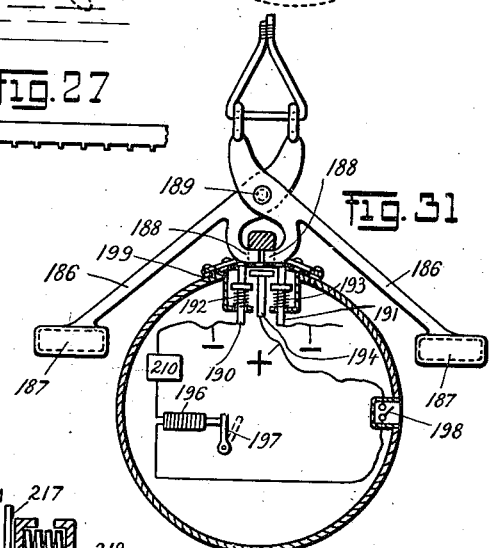
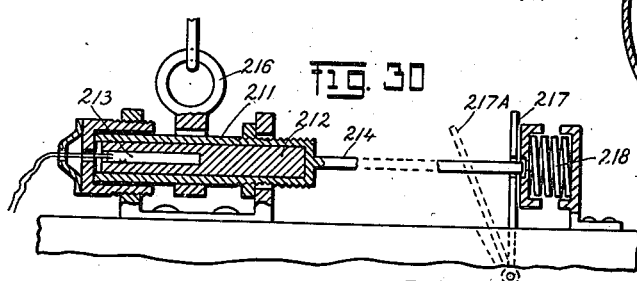
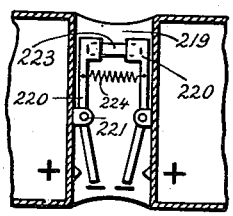
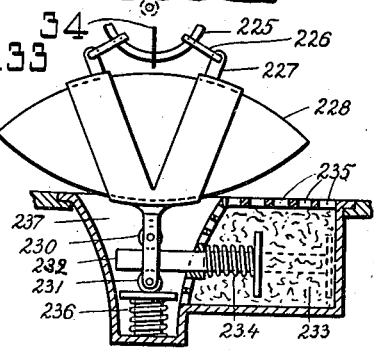
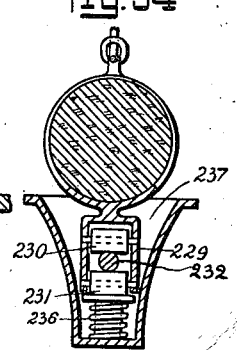
INVENTORS
George Pookhir
George A. Gulbesow

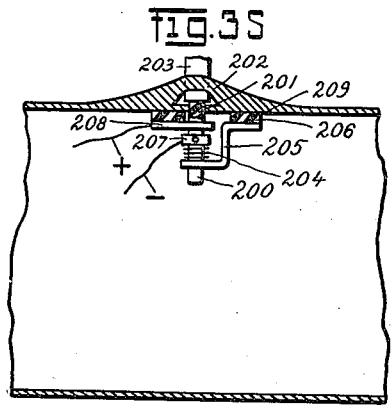
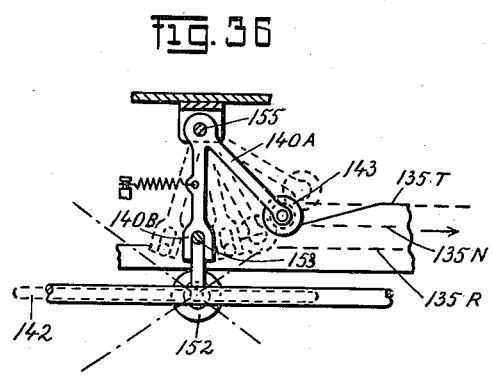
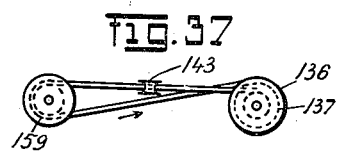
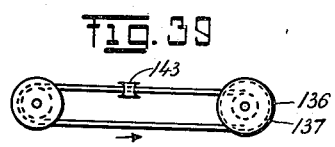
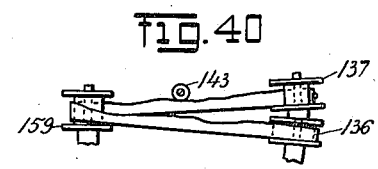
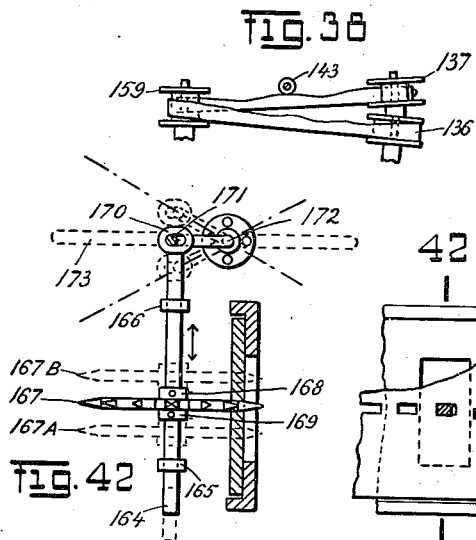
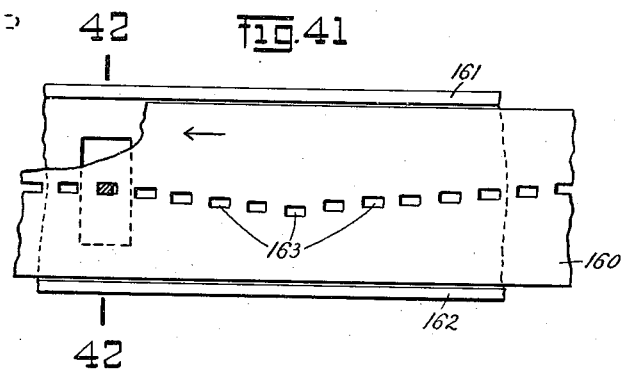

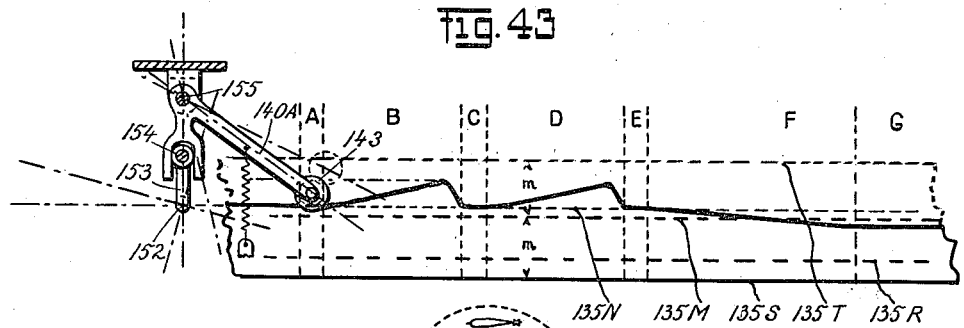
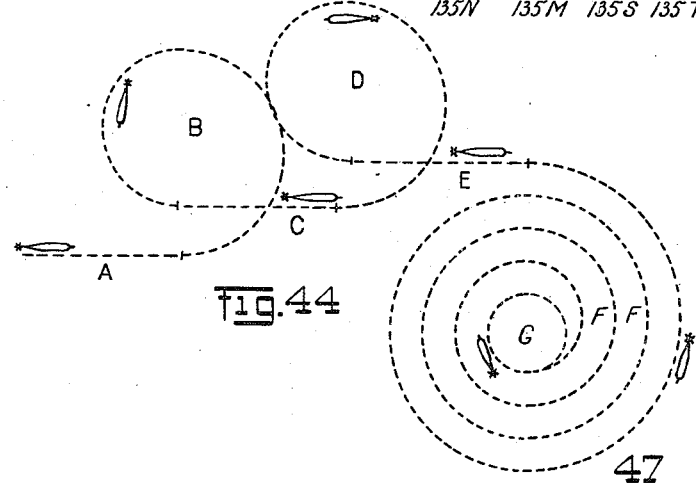
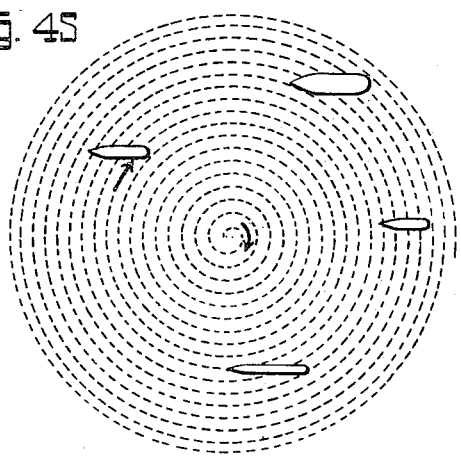
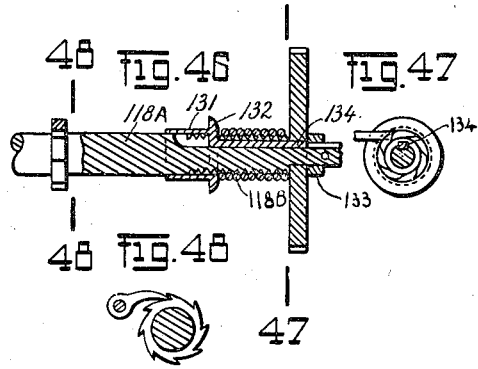

Feb. 8, 1944. G. POOKHIR ET AL 2,341,287
TORPEDO CONTROLLING DEVICE
Filed Aug. 30, 1940 8 Sheets-Sheet 7
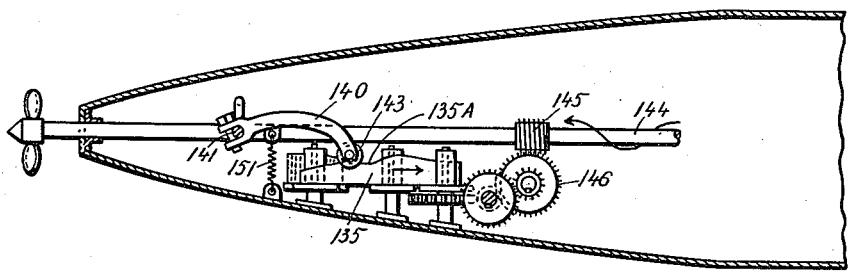
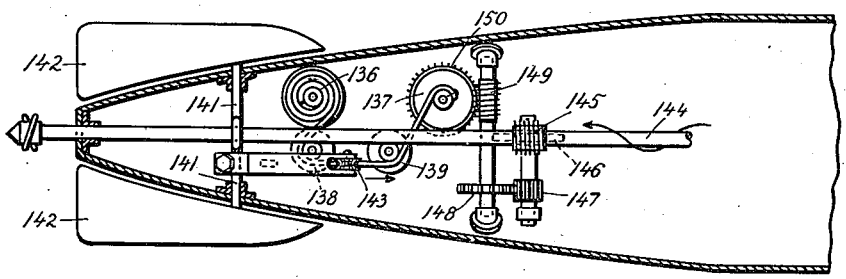
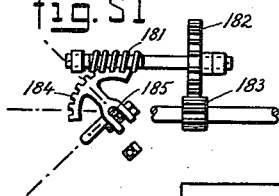
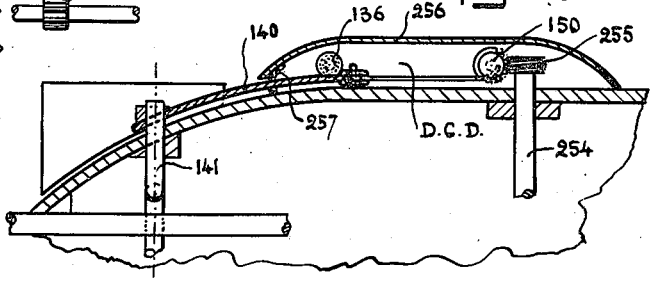
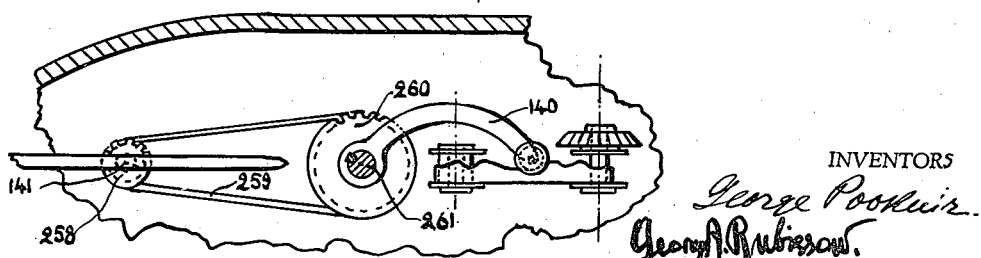
INVENTORS
George Pookhir
George A. Rubissow INVENTORS
George Pookhir
George A. Rubissow Patented Feb. 8, 1944

2,341,287

UNITED STATES PATENT OFFICE 2,341,287

TORPEDO CONTROLLING DEVICE

George Pookhir, Elmhurst, and George A. Rubissow, New York, N. Y.

Application August 30, 1940, Serial No. 354,892

6 Claims. (Cl. 114—23)

This invention relates to a most effective robot weapon for moving bodies. Many types of dirigibles, torpedoes, torpedo boats, mines, submarines and other marine moving bodies are known, but none of them affords completely satisfactory service, nor are they sufficiently simple and reliable in their construction, maintenance and use.

This invention refers to a new type of self-operated or automatic self-propulsive moving bodies, in particular, torpedoes, which are able to follow automatically any desired trajectory in space or on a plane, rendering such trajectories entirely and dependably controllable in advance, by means of an extremely simple and handy device operating entirely automatically and without any assistance or interference by the will of man during its entire operation. Devices such as described in U. S. Pats. #1,923,612, 1,553,687, 1,659,653, 1,562,572, 2,094,997, 2,197,129, 2,060,208, 1,755,125, 1,865,101 1,892,431, 1,806,346, 1,517,873, 2,042,987, 1,557,832, some of which provide a very complicated electro-mechanism with which to operate a torpedo at a distance by means of an appropriate radio-transmitter and receiver, etc. are well known. Such devices are much too complicated and their use is not automatic. Moreover, they are dependent on radio-emissions, can be readily interfered with by the enemy, thus requiring permanent attention of at least several men and at least one radio-transmitter for each torpedo in action, and are very expensive to build. Hence, their practicability is very limited in scope.

The novel features of this invention will more fully appear from the following description when the same is read in connection with the accompanying drawings and the appended claims. It is to be expressly understood, however, that the drawings are for the purposes of schematical illustration only, and are not intended as a definition as to the design or to the limits of the several aspects of this invention.

In the drawings, wherein like reference characters refer to like parts throughout the several views, Figure 1 represents schematically and in a simplified form a side-view in longitudinal vertical cross-section of one embodiment of this invention, mounted on a torpedo.

Figure 2 represents a cross-section view 2—2 of Figure 1.

Figure 3 represents a plan-view of the lever controlling the vertical rudders.

Figures 4, 5, 6, 7, and 8 represent diagrammatically different kinds of direction-controlling discs.

Figure 9 represents schematically positions of vertical rudder and the trajectory of the torpedo referred to respectively.

Figure 10 represents diagrammatically, a side-view in longitudinal vertical cross-section of another embodiment of this invention mounted on a torpedo.

Figure 11 represents a longitudinal horizontal cross-sectional view of Figure 10.

Figure 12 represents a longitudinal-vertical side-view in cross-section of another embodiment of this invention.

Figure 13 is a longitudinal-horizontal cross-sectional view of Figure 12.

Figures 14 and 15 represent schematically plan views of the direction-band.

Figure 16 is a side-view of Figures 14 or 15.

Figure 17 is a side-view of another type of direction band.

Figure 18 is a plan-view of Figure 17.

Figure 19 is a cross-section of 19—19 of Figure 18.

Figure 20 represents a plan-view of one aspect of a direction disk.

Figure 21 represents a side-view of an assembly of a plurality of direction disks.

Figures 22, 23, 24 and 25 represent side-views of different types of direction drums.

Figure 26 represents a plan-view of an adjustable direction disk.

Figure 27 represents a side-view of a part of a guideband.

Figure 28 represents diagrammatically an aeroplane dropping a torpedo.

Figure 29 represents a schematical side-view of a parachute and a torpedo.

Figure 30 represents a longitudinal cross-section of a landing-switch mounted on a torpedo.

Figures 31 and 32 and 33 represent side-views of simplified landing-switches.

Figure 34 represents a cross-sectional view 34—34 of Figure 33.

Figure 35 represents a cross-section of another landing-switch device.

Figure 36 represents a plan-view of a direction-band with the direction-transmitting lever.

Figures 37 and 38 represent side-views of direction-band device.

Figures 39 and 40 represent respectively plan-views of Figures 37 and 38.

Figure 41 represents a plan-view of another aspect of a direction-band.

Figure 42 represents a cross-section of a direction-band 42—42 of Figure 41 with the lever-gear transmitting device.

Figure 43 represents a plan-view of a section of a direction-band and the direction-transmitting lever.

Figures 44 and 45 represent schematically trajectories of moving bodies.

Figure 46 represents a cross-section of a stop-device.

Figures 47 and 48 are cross-sections 47—47 and 48—48 of Figure 46.

Figure 49 represents a diagrammatical side-view in longitudinal-vertical cross-section of another embodiment of this invention mounted on a torpedo.

Figure 50 represents a horizontal cross-sectional view of Figure 49.

Figure 51 represents a side-view of a direction-controlling device.

Figure 52:
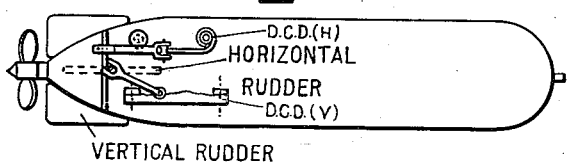

Figure 52 represents a schematical side-view of a moving body provided with two direction-controlling devices, horizontal and vertical.

Figure 53:
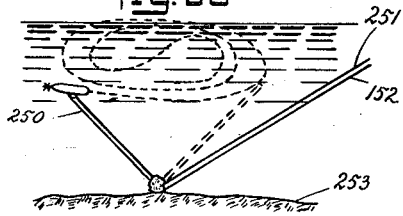

Figure 53 represents a side-view of an air or mine torpedo attached to a wire and operated according to this invention.

Figure 54:
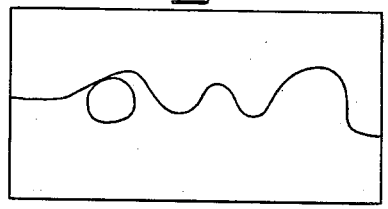
Figure 55:
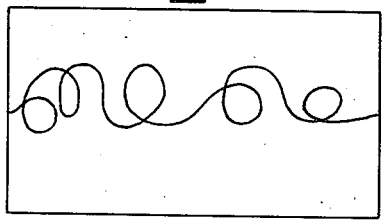

Figures 54 and 55 represent diagrammatical views of the projection on a plane of the horizontal and vertical trajectories.

Figure 56:
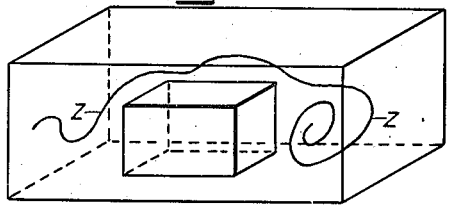

Figures 56 represents schematically in perspective, trajectories in space.

Figure 57:
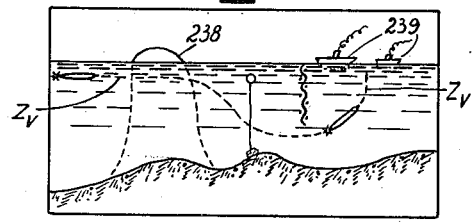

Figure 57 represents a schematic side-view of a horizontal depth-trajectory of one of the applications of this invention.

Figure 58:
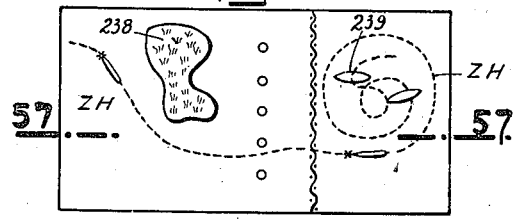

Figure 58 represents a schematical side-view of a vertical trajectory corresponding to Figure 57.

Figure 59:
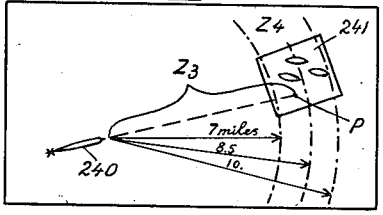
Figure 60:
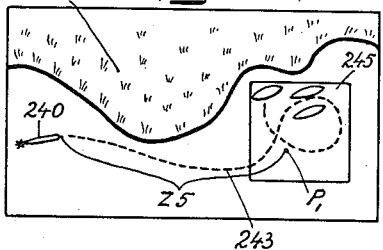
Figure 61:
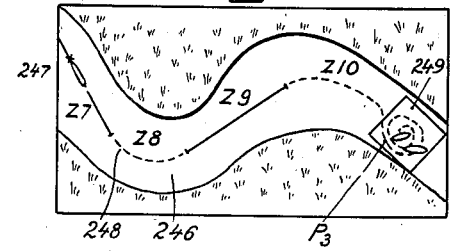

Figures 59, 60, 61 represent a schematical plan-view of various trajectories.

Figures 62 and 63 represent the same as Figs. 43 and 50.

This invention is applicable to any kind of moving bodies, in particular, such bodies as those which are not directed by the will of man, i. e., bodies which follow, after they start to move, predetermined trajectories of their movements, which trajectories are entirely self-controllable by means of an automatically operated device herein described and illustrated in its several espects and applications.

For the convenience of the description, this invention will be described in relation to a torpedo. However, this does not limit its application to any other type of moving body, such as non-piloted aeroplanes, air-mines, self-piloted small Zeppelin-like bombs, torpedo boats, marine-mines, non-piloted submarines, air-torpedo or even ordinary boats of any kind.

The main aspect of this invention consists in a device to be mounted on a torpedo, or the like, which enables the torpedo to be directed automatically during its movements, so that it follows a predetermined trajectory set in advance by an automatically operated direction-controlling means. Such direction-controlling means, according to this invention, may have various embodiments.

One of such embodiments is shown on Figures 1 and 2 comprising a disk 100 provided with guide-ways 101 of a spiral contour. A rigid bar 102 may reciprocate following its own longitudinal axis. A pin 103 is affixed rigidly or rotatably at one end of the bar 102 and is of such a dimension that it fits into the guideways 101. The bar 102 may be square or rectangular in its cross-section and be guided through bearings 104 and 105, rigidly affixed in respect to the frame 106 of the torpedo 107. The bar 102 may be a round bar, provided with longitudinal slit-formed cut-out, into which a guide-member especially provided in the bearing 106 or 107 fits, in order to prevent rotation of the bar.

The axle 102 forms a crank surrounding the main shaft 108 into which crank fits the bent part 109 of the axle 110 of the vertical rudder of the torpedo.

If desired, a spring 111 may be placed, for instance, between 107 and 108 to assist the reciprocating movement of the bar. The axle 110 operates the vertical rudder 112 of the torpedo when the axle part 109 is pushed to and fro by the bifurcated part 108 of the lever 102. When the pin 103 follows the guideways 101, the rudder 112 is turned correspondingly. The guideways may be of any desirable contour, as shown for purposes of example on Figures 4, 5, 6, 7 and 8. Should the pin 103 follows the contour of Figure 8, then, if in the beginning (position 1 of Figure 8) the rudder 112 on Figure 9 is in its neutral, i. e. longitudinal, position, the contour as depicted in Figure 8, will provide corresponding movements of the rudder 112 as shown in positions 1 to 16 in Figure 9, and the corresponding trajectory of the moving body, i. e. of the torpedo, will be represented schematically by the contour shown in the dotted line in Figure 9.

The pin 103 starts to follow the guideway of a direction-controlling disk from the inner end, Figures 1, 4, 5 and 7, or from the outer end, Figures 6 and 8. The starting position of the pin may correspond to any desirable position of the rudder.

This embodiment is actuated by a motor. In the case of a torpedo propulsed by means of compressed air, a small compressed air motor (turbine or piston-like) may be switched to the disk, to rotate the same. An electrical motor may be employed if electric energy is provided. The disk 100 may be also operated by means of gears and worm-gears rigidly affixed to an appropriate shaft of the torpedo, for instance, the gear 113, affixed to the main shaft 114 of the torpedo; another gear 115 operatively connected with 113 and also with a worm-gear 116 which latter rotates the disk 100 provided therefor with toothed circumference 117. Such operative connection will provide a synchronised movement of the rudders in respect to the rotation of the shaft, i. e. to the displacement of the torpedo in space. The guide-way 101 may be only a few inches long in totality, but the displacement of the torpedo may be 10 to 15 miles and the few inches of the said guide-way will then control and prescribe the trajectory of displacement of the torpedo on its total length as shown, for instance, in Figures 3, 43, 44, and 45.

The same automatic control of the rudders may also be achieved by another embodiment illustrated on Figures 10, 11, 12 and 13. In Figures 10 and 11 is shown an axle 118 rotated in the bearings 119—120 rigidly affixed to the frame 106 of the torpedo 107. The axle 118 is actuated by means of worm-gear 121, a gear 122, a worm-gear 123 and a gear-disk 124. The gear-disk 124 is rigidly affixed to the axle 118. The rudder axle 125 has its crank-lever part 126 on which one end of a flexible connection 127 is attached, and the other end rigidly attached to the shaft 118.

When the shaft 118 is rotated, the crank-lever part 126 is moved, and the rudder direction is accordingly altered. A spring 128 must be provided to force the crank-lever to tighten constantly the flexible connection 127. The starting point of the rudder of such a torpedo may be as shown on Figure 11 so that the rudder will turn from 129 to 130.

The total operative length of the flexible connection 127 may be synchronized in a given scale with the total length of the displacement of the torpedo, or it may be synchronized only with a part of it. In this latter case, the shaft 118A, Figure 46, may be provided with a tubular sliding axle, 131, Figures 46, 47, and 48, having an arresting edge 132, so that when the flexible connection 118B reaches the edges 132, the tubular axle 131 is pushed to its left and thereby becomes disconnected from the shaft 118A, Figure 46, by means of the disconnection of the gear-disk 124 from the shaft 118, which is realised when the sliding key member 133 is pushed out to the left from its engagement in slot 134. To permit the rotation of the shaft in one direction only, a ratchet wheel is provided, as shown on Figure 48.

Another embodiment, and the main feature of this invention, is illustrated in Figures 49, 50, 14, 15, 16, 17, 18, 43, 44 and 45. A direction-controlling band 135, made of flat material, preferably flexible, such as metal, wood, plastic, etc., is wound on a drum or a cylinder 136, Figures 49 and 50, and its free end is affixed to the cylinder of another drum 137. The band 135 on its way from 136 to 137 is guided by suitable means, such as, for instance, 138 and 139. One side of the band is of a straight contour and is guided by the disk surfaces of the guide drums 138 and 139, or by other guide means. The other side of the band is of an irregular contour, such as shown in Figures 14, 15 and 43, for purposes of example.

A lever 140 is affixed by its one end rigidly to the axle 141 of the vertical rudder 142, and by its other end is in continuous contact with the irregular contour 135A of the band 135. If desired, a roller-member 143 may be mounted on the free end of the lever 140. The band 135 is unwound from the driven drum 136 and wound up on the driving drum 137 by means of a motor-force, such as provided, for instance, by the shaft 144, a worm-gear 145 rigidly affixed to the shaft 144, gears 146, 147 and 148, a worm-gear 149 and a disk-gear 150, the latter attached to the driving drum 137. The lever 140 is provided with a spring 151 which presses the lever continuously against the irregular contour 135A of the band, when the same is in motion or at a standstill. The band 135, Figures 14, 15 and 16, has its neutral line 135N which should preferably be chosen as illustrated in Figures 36 or 43, i. e. slightly above the middle line 135M. The irregular contour 135A may be of any desired contour, straight-line or curved-line, or a combination of both, and be between 135T and 135R. When the roller 143 of lever 140, Figure 14, is placed on 135N, then the rudder 142 is also in its normal, i. e., straight or longitudinal position, and the torpedo is displaced accordingly, following a straight-line trajectory. When lever 140 is lifted upwards from 135N, it turns the rudder 142 counterclockwise; if in a downward position, it turns the rudder 142 clockwise.

On Figures 36 and 43, the rudder-axle 152, having a crank-lever 153, and provided with a bearing 154, is placed into the bifurcated lever 140B, pivoted on the axle 155 rigid in respect to the frame of the torpedo, and this lever 140B is rigidly attached or forms one piece with the lever 140A. In the section A, Figure 43, the roller 143 is on 135N, and the torpedo makes a straight-line trajectory A, Figure 44.

When roller 143 passes through A, B, C, D, E, F, G, by way of example, the torpedo will make the respective trajectories A, B, C, D, E, F, G, shown on Figure 44.

This device provides an automatic and absolute control of the path the torpedo has to take, and is very inexpensive, simple and absolutely reliable in its construction, maintenance and use.

Any conceivable trajectories for the displacement of a moving body may be easily realised by providing the body with a correspondent direction controlling band, as aforementioned.

The band 135 may also be made from a textile or other flexible material and be composed of a support-band 156, Figures 17, 18 and 19, on which separate band-sections 157 are affixed by means of glue, bolts, or similar means 158, shown by way of example.

Instead of band 135, an endless band, as shown on Figures 12 and 13 may be employed. However, the contour of the band and, consequently, the trajectories of the torpedo, are limited, depending on the length of the endless band. If the endless band is required to run continuously, i. e., several times, the torpedo will make the same number of trajectories, starting each trajectory from the position in which it was at the end of the previous position of the endless band.

The drums 136 and 137 in Figures 49 and 50 may be placed one in respect to the other as shown schematically in Figures 37, 38, 39 and 40, and assisted by a driven, or driving drum 159. The operation of the roller 143 is self-explanatory.

The band 165 of Figures 12, 13 and 43, instead of having an irregular contour 135A, may be of uniform width, as shown on Figure 41 wherein 160 is the band, and 161, 162 are the guide-means for the band. The band 160 is provided with a perforated direction-controlling contour formed by a plurality of perforations 163. A lever-axle 164 is mounted, having the ability of sliding through at least one, but preferably two guide-bearings, 165, 166, rigidly affixed in respect to the frame of the torpedo. The axle 164 may move limitedly, to and fro, longitudinally through bearings 165 and 166. A toothed wheel 167 is mounted, freely rotatable, on axle 164, between two arresting washers 168 and 169 rigidly affixed to axle 164. Axles 164 and wheel 167 can move to and fro, i. e., into positions 167A and 167B.

With the assistance of an operative connection 170, rigidly affixed to axle 164, crank-lever 171 of the rudder axle 172 is operated correlatively to perforations 163. When the toothed wheel 167 contacts the perforations 163, it causes the axle 164 to follow the contour formed by the series of perforations 163, consequently moving the rudder 173 to the left or right.

Still another embodiment of the direction-controlling device is illustrated in Figures 20, 22, 23, 24 and 25. The lever 140 (as shown in Figures 43, 12, 14, or 36), is guided by a disk-shaped member 174. When on N, the rudder is straight; when on maximum or minimum, the rudder moves to the left and right, or vice-versa. A plurality of such disks forms a helicoidal-drum 175, Figure 21, interconnected on a common axle 176 with suitably-shaped washers 177 separating the disks.

A helicoidal drum 178 may also be made from one piece, as shown in Figure 22, or it may take the form of a cylinder 179, Figure 23, into which the helicoidal direction-contour is cut. For such latter embodiments, it will be necessary to employ a roller 180 adapted to follow the groove forming the helicoidal contour.

Still another embodiment of the direction-controlling device is shown on Figure 51 wherein the worm-gear 181 driven by gears 182 and 183 is connected to a gear-segment 184 rigidly affixed to the rudder-axle 185.

A torpedo, in which one of the herein described embodiments is mounted, may be launched from a torpedo-tube, or from an aeroplane, or from a parachute. All direction-controlling devices, the subject of this invention, will hereinafter be designated as DCD.

Fig. 29 shows a torpedo on a parachute. When the torpedo reaches the sea, the parachute is automatically disconnected from the torpedo by suitable means provided therefor—such as, for example, a two-arm, forceps-like device 186, provided on its ends with two floaters 187. Locking tongs 188—188, Fig. 31, grip support member 190 rigidly affixed to the torpedo. When floaters 187 are submerged in the sea, they open locked arms or tongs 188—188 when pivoting around the axle 189. As soon as locking tongs 188—188 are disconnected from the torpedo, the switches 190 and 191 become free and are pushed out by the force of springs 192 and 193, wherewith they establish contact with 194. Two switches, 190 and 191, are shown to offer double security in the event that one switch should fail to operate. A rubber, or elastic, or other flexible membrane 199, for purposes of insulation, may be provided between tongs 188—188 and switches 190—191.

Figure 35 shows another form of switch, having a rod 200, made from a metal, and provided with a metal arresting-ring 207. The extension 201 of rod 200 is made from an insulating material and contacts the locking-tongs 203 similar to 188—188, Figure 31. When 203 is pushed out from support 202 the rod 201 is pushed upwards and establishes contact with the other wire 208 insulated from the frame 209 by means of a washer 206.

A hand-operated safety-switch 198 may be provided as shown on Figure 31 to permit the manipulation and transport of the torpedo prior to its launching and its connection with tongs 188—188 of the parachute's floater-forceps.

As soon as the electric current is switched on through 190, Figures 31 and 35, or 191, Figures 31 and 35, or through 200, 207, 208, Figure 35, this current passes to the relay solenoid 196—or, if desired, through an amplifier 210—thereby operating the starting-device 197 represented, by way of example, as a lever, which lever opens the valve and starts the operation of the main motor which turns the shaft of the propellers of the torpedo.

The current from switch 190, 191 or 200 may also pass to a device composed of a tube 211, Figure 30, in which an explosive compound 212 is exploded by means of a detonating fuse placed in 213, into which the said current is sent. As soon as 212 explodes, the tube 211 is broken, and also the rod 214, whereby the parachute support 216 is disconnected, and at the same time, lever 217 of a starting-device, is pushed to 217A by the spring 218. Thereafter, the motor of the torpedo begins to run, and the torpedo is in action, i. e., begins to propulse. Simultaneously, the DCD herein described, also begins to operate, and the torpedo thus automatically pursues in its course the predetermined trajectories.

Instead of a switching device, as shown on Figures 31 and 35, a device as shown on Figure 32 may also be employed, consisting of a chamber 219 extending downward through the walls of the torpedo, or affixed on the outside surface of the torpedo; one or more levers 220 pivoted on axle 221; a chemical compound 223 which dissolves or becomes pasty or destroyed on contact with the sea, is placed between levers 220—220; a spring 224 to pull one lever toward another; whereby as soon as the chemical compound is dissolved, lever 220 is pressed by spring 224 and contact takes place.

This latter device may be connected to an amplifier and a solenoid which will disconnect the parachute from the torpedo and also start the running of the torpedo-motor.

Still another device may be used for disconnecting the torpedo from the parachute as shown on Figure 33, wherein a parachute support-ring 225 is attached by connecting means 226 to the support 227, rigidly affixed to the floater 228, filled with air or gas, or made of cork. The floater is connected with bifurcated member 229, on which two rollers 230 and 231 are mounted. A sliding bar 232 is mounted in a chamber 233 and assisted by a spring 234. A plurality of holes 235 are provided in the chamber. The spring 236 is mounted on the bottom of the form-member 237; the chamber 233 is filled with the chemical compound which dissolves or becomes liquid on contact with the water. The compound is placed in previously compressed bricks 238 or is compressed when charged into chamber 237. The bar 232 locks the parachute support 230—229—231. As soon as the chemical compound contacts the water, the bar unlocks the support which is pushed out by the spring and the parachute is thus disconnected. Another spring 236 assists in pushing out support 229—230—231 from the form-member 237.

The new military tactic engendered by the use of the automatic dirigible torpedoes of the character herein described, provided with DCD, is of great military importance. This new military tactic consists, in accordance with this invention, in the use of the herein described DCD and its embodiments, and cannot otherwise be attained. For this reason, this new tactic is also the subject of this patent specification.

This new tactic will be described in reference to:

(1) A torpedo launched from a torpedo boat into the sea.

(2) A torpedo or other moving body able to explode launched from an aeroplane without parachute.

(3) A torpedo or other moving body able to explode launched from an aeroplane with parachute.

(4) A surface torpedo-like body, or boat only partly submersible in the water, to be launched from a ship or from a torpedo boat.

(5) A mine provided with self-propulsive motor and direction-controlling device.

(6) An air-torpedo or aerial-zeppelin provided with direction-controlling device.

The existing modern tactic has a very low accurate aiming percentage and several hundreds, and sometimes thousands of torpedoes, mines, etc. must be launched or dropped in order to hit even one objective, such as a ship, port or other military objective. The aim of a torpedo sent from a torpedo boat at a distance more than 5 to 6 miles from its objective, is very doubtful.

The percentage of accurate aiming becomes very high with the employment of the new tactic described herein, and in several circumstances, every torpedo sent off will reach its objective and destroy it.

This may be illustrated by the following:

The enemy's ships are located somewhere around "x" degrees longitude and "y" degrees latitude, a distance of from 7 to 10 miles from the torpedo boat 240. These ships are dispersed over a one-square mile surface 241, and the existing type of torpedo is fired to hit one of these ships. The chances of making a direct hit, however, with that type of torpedo, is practically zero, whereas, in the same given conditions, the new tactic herein described, assures almost perfect accuracy of aim and attainment of direct hit at the desired objective, even if the ships are not within sight of the torpedo boat.

This is achieved, for example, by launching a torpedo equipped with a DCD in such a manner that the torpedo will be initially directed by the said direction-controlling device (DCD) toward the point aimed at, so that the first $$\frac{7+10}{2}=8.5$$

miles (or 7 or 10 miles) will be a straight line 242 as shown on Figure 59, or will be a curved line 243, Figure 60, if the coast or land 244 prevents the use of straight-line trajectories.

This new type of torpedo will reach the area 241 or 245 over which the enemy's ships are scattered at a desirable point set out by the DCD, for instance, at point P or P1. Thereafter, the DCD which is set in advance, will cause the torpedo to make several spirals or curves of a suitable character, in order to make a direct hit on an enemy ship in its course within the enemy zone. For purposes of example, such spiral or curve may be of a character as illustrated on Figures 45, 59, 60 or 61. The total length L of the trajectory of the torpedo (composed of $Z3+Z5$) from the torpedo boat 240 to the point P, and $Z4$ or $Z6$ from point P to the end of the spiral (or other curve), i. e., when the torpedo stops—is equal to the maximum radius of action of a torpedo ($L=Z3+Z4$ or $L_1=Z5+Z6$). For instance, if a torpedo may cover $L=15$ miles in total, the first distance may be $Z3=8\frac{1}{2}$ miles and the spiral or curve from point P, $15-8\frac{1}{2}$, i. e., $Z4=6\frac{1}{2}$ miles. The spiral or curve ($Z4$ or $Z6$) may be so predetermined and prescribed by the DCD, that each neighboring trajectory section of the spiral or of the curve, passes one from another at a distance equal to the width or the length of the enemy's ships, or any desirable distance in accordance with the safety coefficient of aiming to be taken into consideration.

The choice of L or $L_1$ and of $Z3$ and $Z4$ or $Z5$ and $Z6$ may be made in accordance with the best solution offered by the theory of variation. If a river 246 must be passed in the course of the torpedo 247, Figure 61, the DCD may be set in advance to prescribe the trajectory 248 composed of $Z7$, $Z8$, $Z9$, $Z10$, and when P3 is reached, the torpedo may then start its last curve or spiral searching-enemy's-ship trajectory, to cover the entire area 249 where the enemy's ships are supposed to be located. When a torpedo is launched from an aeroplane without a parachute, i. e., near the surface of the sea, it should be launched in the direction in which the torpedo has to start its trajectory, in accordance with the DCD.

A moving body, in particular, a torpedo, an aerial torpedo, or a balloon barrage carrying a detonator and explosive, may be attached as shown on Figure 53 to a flexible connection which is attached to the bottom of the sea or the ground, which bodies when propulsed by a motor create a protective moving net of any predetermined desirable contour. Such moving bodies may be also propulsed by an electric motor connected by wires or through cables on which they are attached to the power-station situated on the ground or on a ship, as the case may be, providing thus a propulsion during any desirable time.

Figure 53 shows a torpedo or a mine moving through the sea, attached to the bottom of the sea 253 by a cable 250 and operated by an electric motor receiving the current through wires 251 and 252 from a power-station. The same arrangement may be employed for an aerial torpedo able to maintain itself by its buoyancy in the air. The balloons in present use, being immovable, present a very easy target for the enemy. They may be equipped with an electric motor and a DCD and their attaching cables may be used as wires for transmitting the electric energy from the ground thus enabling such balloons to pursue a trajectory prescribed by the DCD. The balloon should be provided with at least one vertical rudder if only DCD (V) Figure 52, is provided. Should both horizontal and vertical rudders be used, then DCD (V) and DCD (Y) Figure 52, should be provided.

Figure 52 depicts a torpedo the arrangement of which can be employed on any other moving body, in particular, a balloon, or Zeppelin-like explosive-carrier.

For purposes of launching a torpedo from an aeroplane, such torpedoes may be specially designed to be of any suitable or required dimensions. Also, small torpedoes may be used of about one-third the weight of the larger marine torpedoes, and be very effective. They can be dropped, for instance, from a plane so that they fall somewhere in the zone of their objective. If the zone is a square 4 x 4 miles in area, then eight aeroplanes flying side by side, one parallel to the other, at a distance of one-half a mile apart from each other, each plane can drop eight torpedoes every half-mile of their flight. For purposes of additional safety and surety that the objective will be attained, two additional planes may fly a half-mile or a quarter-mile outside of the zone, and also drop a torpedo every half-mile, i. e., eight torpedoes each during the flight. These ten planes dropping eighty torpedoes will thus drop one torpedo in each one-half square mile of the enemy zone, i. e., $8\times 8=64$ torpedoes plus 16 torpedoes dropped outside of the zone occupied by the enemy. Each torpedo, as it falls, will start to propulse and make spirals, the neighboring contours of which may, for instance, be at a distance of 200 to 300 feet from each other. Each torpedo may describe from five to ten spirals while completely covering its respective one-half square mile, and this in such a manner that no enemy ship or objective can escape.

This is due to the fact that if, for purposes of example, ten spirals are made for each ½ square mile, their neighboring contours of the same spiral will be only at approximately 132 feet from each other, hence, any object which is greater than 132 feet will be hit. For still greater safety, the width of the ship should be taken into consideration. For instance, if the ships are 300 feet long and 100 feet wide, a spiral, the composing curvatures of which are at a distance at 100 feet apart, will cover the zone with 100% hitting efficiency. These eighty torpedoes will thus destroy every ship in the zone. If the enemy's ships are in motion, two torpedoes can be dropped for each ½ square mile, in which case no moving ship will have a chance to escape the path of the trajectory. The 80 planes flying at a speed of 120 or 240 miles an hour will cross the zone in one or two minutes, so that the torpedoes will be dropped at an average of one approximately every 7 or 14 seconds. Hence, it is obvious that the enemy will have no time to counter-attack. Furthermore, the aeroplanes can drop the torpedoes from a height impossible to attain by anti-aircraft or pursuit ships. This tactic is given by way of example, only.

It is known that all Government arsenals, in particular, the arsenals of the United States, possess enormous reserves of obsolete mines and torpedoes, which cannot be effectively used in modern warfare. This invention permits the use of such torpedoes and mines, even of those manufactured as long ago as 1898, 1900, 1905, 1908 and 1910. This is done by mere application of the DCD the subject of this invention, to these obsolete mines or torpedoes, which, as a rule, will have enough room for such installment, inasmuch as this DCD device can be made as small as required in order to fit therein or thereon.

If necessary, such a DCD device can also be mounted on the surface of the obsolete torpedo or mine, as shown on Figures 62 and 63. Lever 140 of the same type of DCD as illustrated in Figures 49 and 50 (this embodiment is chosen by way of example, only) may be directly attached to the axle 141, as shown in Figure 62. The drum 150 may be interconnected with the motor by means of an axle 254 operatively connected with the motor of the torpedo and through a worm-gear or another gear-arrangement 255 to the drum 150. Such DCD (E) may be enclosed in a stream-lined casing 256 in which an aperture or slit is provided for the passage and displacement of the lever 140. There is no danger of dirt entering into it because of the forward movement of the torpedo. However, a rubber or textile membrane 257 may be provided to prevent the entrance of any foreign body. If desired, gear 258 may be attached to the axle 141 of the vertical rudder and operatively interconnected by a chain 259 to another gear 260, mounted on an axle 261 especially provided and rigid in respect to the frame of the torpedo. These axles are thereafter operated by a DCD (E) device of the same type as shown on Figure 62 in which case the lever 140 of Figure 62 operates first gear 260 and thereafter through chain 259, the gear 258 and the vertical rudder. Such arrangement, by the choice of a larger diameter for gear 260 than for the gear 258 will thus permit the use of a very narrow band, and the direction-giving width located between the line 135T and 135R can be reduced to a very small dimension, and still offer very exact control of any desirable orientation of the vertical rudder.

Instead of gears 258 and 260, wheels or pulleys may be employed operatively interconnected by means of a flexible connection. One point of such flexible connection must be rigidly affixed to the driven pulley which is rigidly attached to the axle of the rudder, and another point rigidly affixed to the driving pulley. This is not shown on the drawing being self-explanatory.

On the sea and in times of war, it may be expedient to have the direction band prepared by a member of the crew. This operator should have before him a map, in order to trace thereon with a pencil, the desired trajectory, beforehand, starting the said trajectory with a straight line. The map should be rigidly attached to, or, able to slide perpendicular to the longitudinal axis, along a suitable drum or moving plate of some kind so that the said starting line of the trajectory coincides with the neutral position of the vertical rudder. Thereafter, when the band and the map are both displaced, one parallel to the other (the starting line of the map being parallel to the neutral line of the band), and, if deemed expedient, synchronized in such a way that for each longitudinal displacement of the map, a desirable length of the band is also displaced simultaneously and proportionately, both displacements proceeding at constant speeds, complete synchronization is thereby achieved.

Suitable lever arrangements such as used, for example, for measuring the length of the curves or for reducing apparatus from big scale to small scale may also be employed, in which one lever will follow the contour on the map and another cut out the corresponding trajectory in the band. If, for instance, the map is ten inches long and eight inches wide, and the band is 200 inches long, corresponding to 15 miles of trajectory, and if the trajectory is traced, and its range on the map be ten inches, then the map has to move so that the range of the trajectory will be more or less proportionate to the length of the direction-giving contour of the band. Should such length be, for example, 15 miles, and more or less proportionately deviated from the line of range, then, to simplify this description, the map should be displaced $\frac{1}{10}$ of an inch at a time, the band correspondingly moved two inches at a time, and for each displacement, the machine cutting the band must cut the band in such a place that it will correspond at a known speed of torpedo, to the required displacement of the rudder necessary to produce the corresponding portion of the trajectory, all such cuts, one connected to the other, forming the direction-giving contour of the band.

A similar tactic may be employed with a very high degree of success and efficiency for destroying the enemy's transports on sea in convoys. The pilot of the aircraft carrying the torpedoes built according to this invention, must divide the length of the convoy into imaginary sections and drop the torpedoes somewhere in the middle of the convoy, as well as in advance of it. The trajectory to be used for this particular aim may consist of a sinus-like curve traveling along the convoy in the same direction and at any suitable speed (or at a greater speed than that at which the convoy is moving). The trajectory may also be an elliptical spiral, the longitudinal axis of which is equal to the length of the convoy. Each curve composing the spiral, may, in addition, be sinus-like. If the convoy is about a mile long and five or ten torpedoes are launched, each ship of the convoy will unfailingly be hit because the trajectories will transverse in all directions a space of about one mile in length and about a quarter of half a mile in width through which the convoy is moving. The total length of the torpedoes' trajectories being 150 miles (considering, by way of example, that each torpedo makes a trajectory 15 miles long), the entire convoy must, in consequence, without any interference or control by man-power, be destroyed. The enemy is powerless against this weapon.

The trajectory suitable for such standard targets as convoys, shores or ports, of an enemy zone of a definite contour, may easily be standardized, due to the fact that the most efficient curves for each purpose may be calculated.

The new tactic offered by this direction-controlling device, the DCD which is the subject of this invention, cannot be conjectured or discovered by the enemy, inasmuch as the trajectory prescribed and predetermined by the DCD is unknown, thereby making it impossible for the enemy to be either forewarned or forearmed.

Having now particularly described and ascertained the nature of our said invention and in what manner the same is to be performed, we declare that what we claim is:

1. A moving body having a vertical and horizontal rudder, in particular, a torpedo, comprising at least one automatic direction-controlling device of the character referred to, composed of a long band freely movable longitudinally, one edge of said band being a straight line and the other edge being of a predetermined contour, a lever mounted to pivot about an axis which is fixed relatively to the moving body, said lever being provided on its one end with guide-means which continuously contact the said predetermined contour, with its other end operatively interconnected with the axle of at least one of said rudders, the said lever being urged towards the said contour by resilient means provided on said lever, rotatable members on which said band is wound and unwound, means establishing a synchronized operative interconnection of one of the said members with one of the shafts of the mechanism which propels the said moving body, whereby when the said moving body follows a predetermined trajectory of any expedient length and form, the said trajectory is at any point controlled and prescribed by the corresponding point of the said predetermined contour set forth in advance.

2. A moving body having a vertical and horizontal rudder, in particular, a torpedo, comprising at least one automatic direction-controlling device of the character referred to, composed of a long band freely movable longitudinally, one edge of said band being a straight line and the other edge being of a predetermined contour, a lever mounted to pivot about an axis which is fixed relatively to the moving body, said lever being provided on its one end with guide-means which continuously contact the said contour, with its other end operatively interconnected with the axle of at least one of said rudders, the said lever being urged towards the said contour by resilient means provided on said lever, rotatable members on which said band is wound and unwound, means establishing a synchronized operative interconnection of one of the said members with one of the shafts of the mechanism which propels the said moving body, said guide means contacting the said contour perpendicular to its longitudinal axis, and parallel to the plane of the band, whereby when the said moving body follows a predetermined trajectory of any expedient length and form, the said trajectory is at any point controlled and prescribed by the corresponding point of the said predetermined contour set forth in advance.

3. A moving body having a vertical and horizontal rudder, in particular, a torpedo, comprising at least one automatic direction-controlling device of the character referred to, composed of a long band freely movable longitudinally, one edge of said band being a straight line and the other edge being of a predetermined contour, a lever mounted to pivot about an axis which is fixed relatively to the moving body, said lever being provided on its one end with guide-means which continuously contact the said contour, with the other end operatively interconnected with the axle of at least one of said rudders, the said lever being urged towards the said contour by resilient means provided on said lever, rotatable members on which said band is wound and unwound, means establishing a synchronized operative interconnection of one of the said members with one of the shafts of the mechanism which propels the said moving body, said band being provided with another guide-means which guides the straight edge of the said band, whereby when the said moving body follows a predetermined trajectory of any expedient length and form, the said trajectory is at any point prescribed by the corresponding point of the said predetermined contour set forth in advance.

4. A moving body having a vertical and horizontal rudder, in particular, a torpedo, comprising at least one automatic direction-controlling device of the character referred to, composed of a long band freely movable longitudinally, one edge of said band being a straight line and the other edge being of a predetermined contour, a lever mounted to pivot about an axis which is fixed relatively to the moving body, said lever being provided on its one end with guide-means which continuously contact the said contour, with its other end operatively interconnected with the axle of at least one of said rudders, the said lever being urged towards the said contour by resilient means provided on said lever, rotatable members on which said band is wound and unwound, means establishing a synchronized operative interconnection of one of the said members with one of the shafts of the mechanism which propels the said moving body, said guide means consisting of a roller provided with runways to register the said predetermined contour, said roller being rotatable on an axle mounted on said lever, whereby when the said moving body follows a predetermined trajectory of any expedient length and form, the said trajectory is at any point prescribed by the corresponding point of the said predetermined contour set forth in advance.

5. A moving body as set forth in claim 1, provided with at least two of said direction-controlling devices, one of which operates the vertical rudder and the other the horizontal rudder, whereby when the said moving body follows a predetermined trajectory in two planes, the said trajectory is at any point prescribed by the corresponding point of the said predetermined contour set forth in advance.

6. A device as set forth in claim 1, wherein the said automatic direction-controlling device is mounted on the outer wall of said moving body and a stream-lined protective covering provided on said outer wall and housing said controlling device.

GEORGE POOKHIR.
GEORGE A. RUBISSOW.